A. W. FARNSWORTH.
SPRING SUSPENSION FOR VEHICLES.
APPLICATION FILED DEC. 22, 1917.

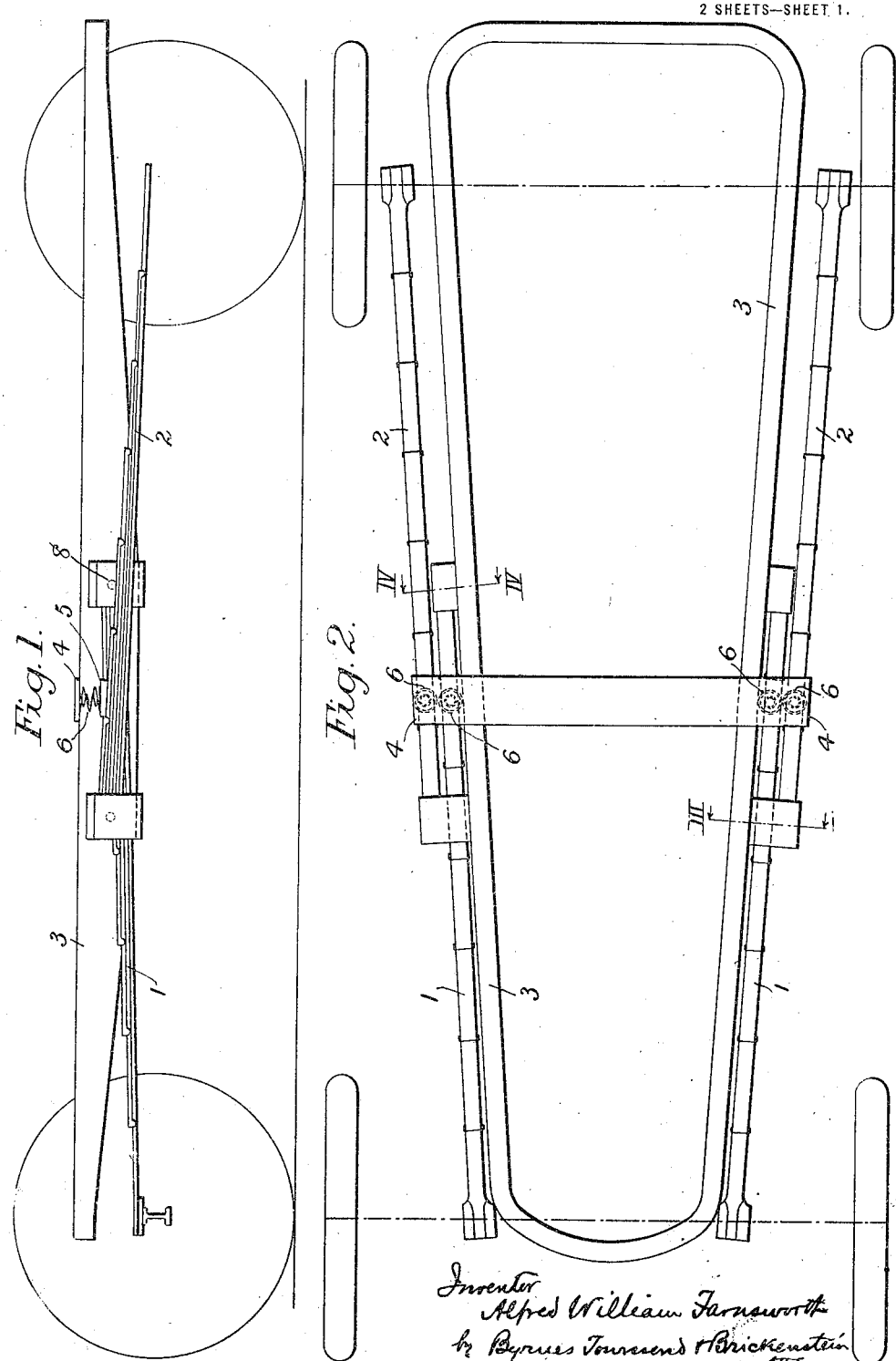

1,273,052.

Patented July 16, 1918.

Inventor
Alfred William Farnsworth
by
Byrnes Townsend & Brickenstein
Attys.

UNITED STATES PATENT OFFICE.

ALFRED W. FARNSWORTH, OF DERBY, ENGLAND.

SPRING SUSPENSION FOR VEHICLES.

1,273,052.    Specification of Letters Patent.    Patented July 16, 1918.

Application filed December 22, 1917. Serial No. 208,483.

*To all whom it may concern:*

Be it known that I, ALFRED WILLIAM FARNSWORTH, a subject of the King of the United Kingdom of Great Britain and Ireland, residing at 6 The Strand, Derby, England, have invented certain new and useful Improvements in Spring Suspensions for Vehicles, of which the following is a specification.

This invention relates to improvements in wheeled vehicles and the like and has for its object the provision of means whereby the maximum of resiliency is obtained, but with a minimum of oscillation in order to give a much easier riding vehicle than those hitherto in use.

According to the invention long cantaliver springs arranged longitudinally with respect to the vehicle are rigidly or pivotally fixed by one end either at or near to the center of the chassis according to the requirements of the designer, in such a manner that the front axle springs will be thus connected to the chassis at points behind the similar connections for the back springs. Thus if it was determined to suspend the chassis exactly at the center of its length the fixed or pivotal connections for the rear axle springs would be on the half of the chassis nearest the front axle, and the connections for the front springs would be on the half nearest the back axle. The actual suspension of the chassis framework is then accomplished by interposing between perches fixed to the chassis framework and the laminated springs, other springs or resilient members for instance suitable coil springs, or pneumatic or rubber buffers, in such a manner that flexion or movement of the laminated springs will also compress the interposed springs, and road shocks will practically be prevented from reaching the vehicle body-work, and the combination of springs having differing periods will produce a very desirable dampening effect. If the said interposed springs are of the coil type they may have one coil placed inside another, each coil having a different periodicity to the other in order to further increase the damping effect.

In order that this invention may be clearly understood reference is made to the accompanying drawings in which two examples of chassis according to the invention are illustrated. In said drawings:—

Figure 1 is a side elevation,

Fig. 2 is a plan, and,

Figure 3:
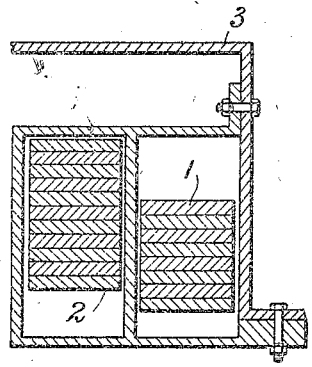
Figure 4:
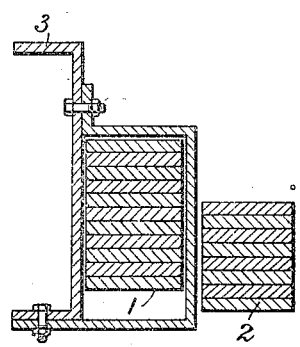

Figs. 3 and 4 sections on lines III—III and IV—IV respectively of Fig. 2.

Figure 5:
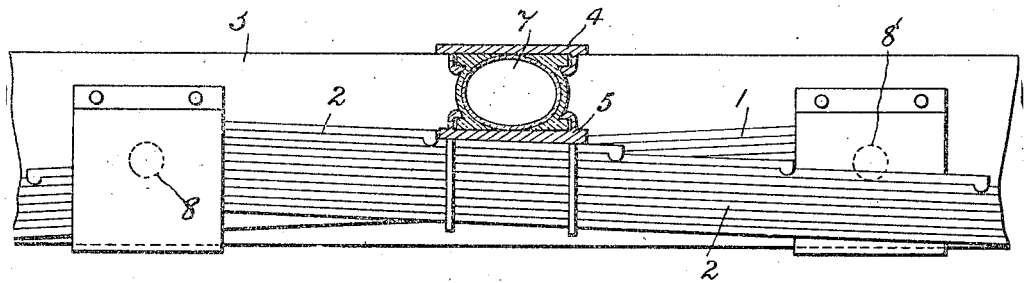

Fig. 5 illustrates an alternative form of suspension.

Referring in the first place to Figs. 1 to 4, 1, 1 are two front cantaliver springs and 2, 2 are two back cantaliver springs supported at their outer ends on the wheel axles and overlapping at their inner ends as shown. Any suitable well known means of connection with the axles may be employed. 3 is the usual chassis-framework carrying the body, to which framework the springs 1, 1 and 2, 2 are pivotally connected in this example as by pivotal pins 8. Said springs might however be rigidly connected to the framework. On the chassis-framework and between the connections of the springs a perch 4 is provided and plates 5, 5 are fixed on the springs opposite said perch, and between said perch and plates two or more pairs of coil springs 6, 6 are interposed, the positions of these secondary springs being, as shown in the drawings, such that their respective center lines are approximately in the same vertical plane. Referring however to Fig. 5, it will be seen that instead of said coil springs pneumatic buffers 7 may be employed. A pneumatic suspension such as that illustrated for example or one of any other suitable type is considered a feature of great importance.

I claim:—

1. A vehicle in which the chassis is insulated from road shocks by means of overlapping cantaliver springs which are arranged longitudinally with respect to the vehicle and are suitably connected to the chassis framework and which are provided with secondary resilient members interposed between themselves and the chassis framework in such a manner that the center lines of said resilient members are approximately in the same plane, said plane being at or about the center of the length of the vehicle.

2. A vehicle in which the chassis is insulated from road shocks by means of overlapping cantaliver springs which are arranged longitudinally with respect to the vehicle and are pivotally connected to the chassis frame-work and which are provided with secondary resilient members interposed between themselves and a perch fixed on the chassis frame-work in such a manner that the center lines of said resilient members are approximately in the same plane, said plane being at or about the center of the length of the vehicle.

In testimony whereof, I affix my signature in the presence of two witnesses.

ALF. W. FARNSWORTH.

Witnesses:
RICHARD OSBORNE,
GWENDOLINE BROADHURST.